July 23, 1935. H. H. FEBREY 2,008,787

RAIL BOND

Filed Sept. 24, 1926 3 Sheets-Sheet 1

Witnesses:
Edwin Trueb

Inventor:
HAROLD H. FEBREY,
by D. Anthony Usina
his Attorney.

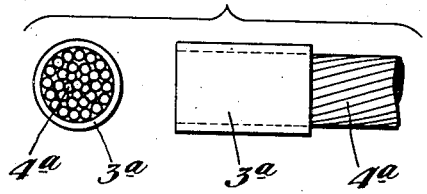
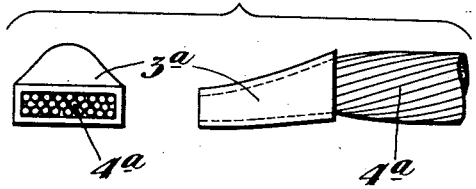
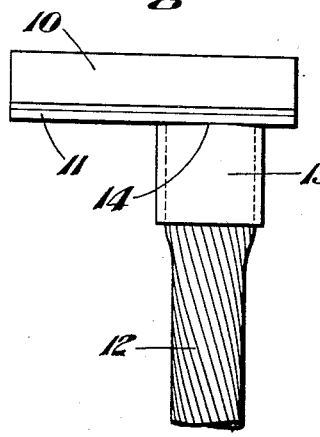
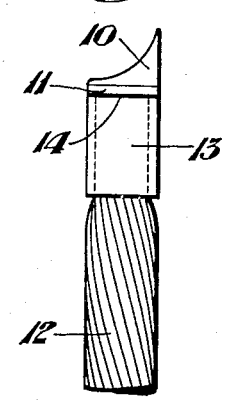
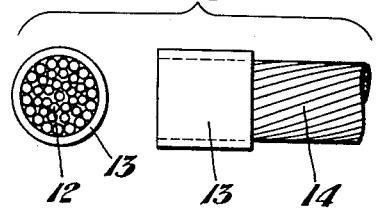
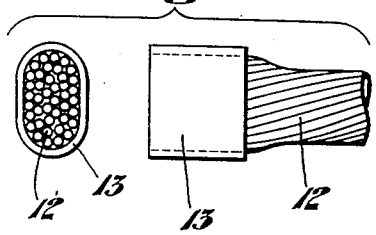
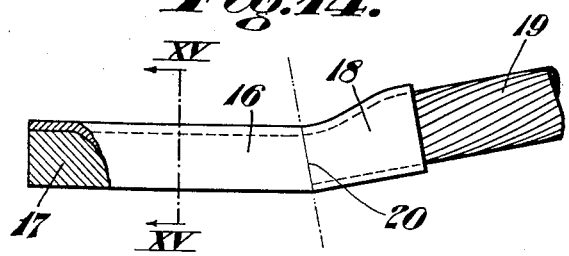
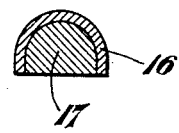

July 23, 1935.  H. H. FEBREY  2,008,787
RAIL BOND
Filed Sept. 24, 1926.   3 Sheets-Sheet 3

Witnesses:
Edwin Trueb

Inventor:
HAROLD H. FEBREY,
by: D. Anthony Laine
his Attorney.

Patented July 23, 1935

2,008,787

UNITED STATES PATENT OFFICE 2,008,787

RAIL BOND

Harold H. Febrey, Newark, N. J., assignor to The American Steel and Wire Company of New Jersey, a corporation of New Jersey Application September 24, 1926, Serial No. 137,457

8 Claims. (Cl. 219—10)

This invention relates to rail bonds and more particularly to an improved rail bond construction and method of producing the same.

This application is a continuation-in-part of application Serial No. 688,009, filed January 23, 1924, and abandoned March 21, 1928.

Heretofore rail bonds having solid or rigid terminal portions have been assembled and the parts have been pressed, brazed or welded together by the use of the flame or electric arc methods of welding, and then the terminals have been forged to force the metal of the welded joints together to form close texture, non-porous joints having good electrical conductivity, and to shape the terminals. This method while providing a satisfactory bond was slow and expensive.

The present method consists generally in forming the terminals in two parts, a body portion and a sleeve, securing the sleeve on the end of the conductor and then uniting the butt ends of the conductor and sleeve onto the body portion of the terminals by electric resistance welding means. Electric resistance butt welding is materially faster than the drop forging flame or arc welding or brazing as used heretofore and produces a close grained non-porous joint which does not need to be forged to make a good electrical connection as do the welded joints used heretofore in this art and produced by the flame or arc welding methods. Therefore, a materially improved form of bond is produced at a materially less cost than by the old methods.

In the drawings:

Figure 8 shows a plan and end elevation of one end of a bond conductor having the sleeve portion of the bond terminal of Figures 6 and 7 mounted thereon.

Figure 9 shows side and end elevations of the conductor end and sleeve of Figure 8 after being pressed in shape to fit the terminal body.

Figure 10 is a plan, and Figure 11 is a side elevation of one end of a T-head arc-weld bond constructed in accordance with this invention.

Figure 12 shows a plan and end elevation of one end of a bond conductor having the sleeve portion of the bond terminal of Figures 10 and 11 mounted thereon.

Figure 13 shows a plan and end elevation similar to Figure 12 after the sleeve and conductor butt end have been pressed and shaped to fit the terminal body.

Figure 14 is a side elevation of one end of a straight terminal bond constructed in accordance with this invention.

Figure 15 is a sectional elevation on the line XV—XV of Figure 14.

Figure 1:
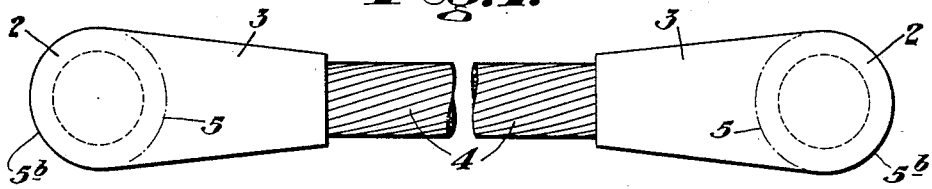
Figure 1 is a plan view of a rail bond constructed by the method of and in accordance with this invention.
Figure 2:
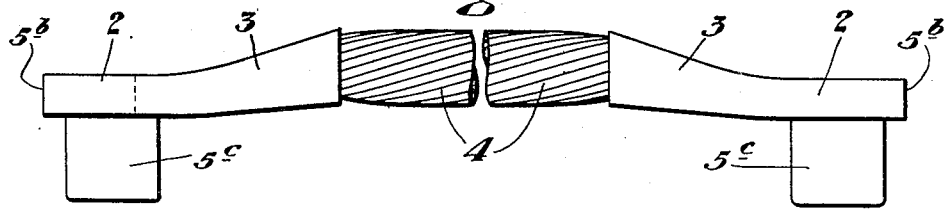
Figure 2 is a side elevation of the same.
Figure 3:
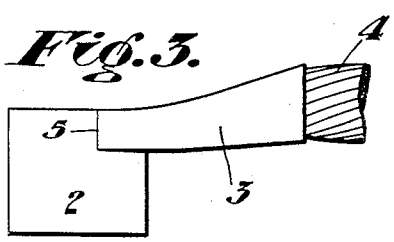
Figure 3 is a side elevation of a partly finished terminal of the bond of Figures 1 and 2.
Figure 4:
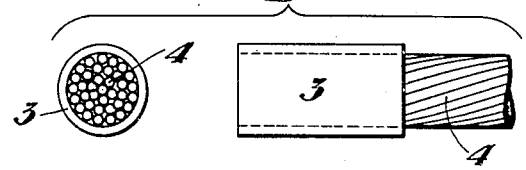
Figure 4 shows a plan and end elevation of one end of a bond conductor having the sleeve portion of the bond terminal mounted thereon.
Figure 5:
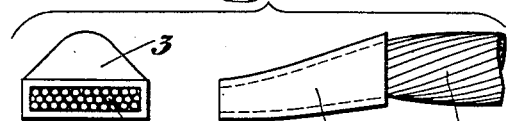
Figure 5 shows side and end elevations of the conductor end and sleeve of Figure 4 after being pressed and shaped to fit the terminal body.
Figure 6:
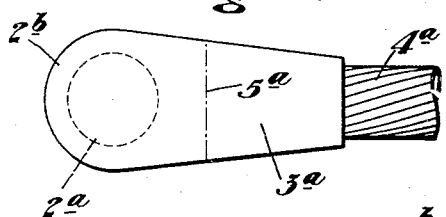
Figure 6 is a plan of one end of a rail bond constructed in accordance with this invention in which the head of the terminal is forged to shape.
Figure 7:
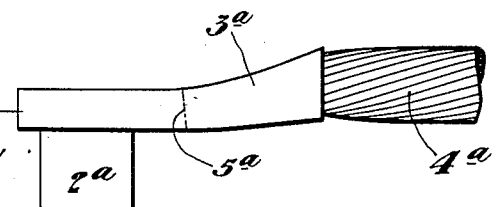
Figure 7 is a side elevation of the bond end shown in Figure 6.
Figure 16:
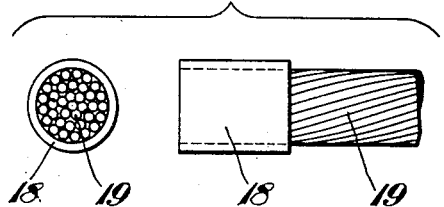
Figure 16 shows a plan and end elevation of one end of a bond conductor having the sleeve portion of the bond terminal of Figure 14 mounted thereon.
Figure 17:
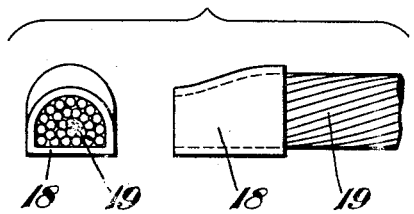
Figure 17 shows side and end elevation of the conductor end and sleeve of Figure 16 after the sleeve and conductor end have been pressed and shaped to fit the terminal body.
Figure 18:
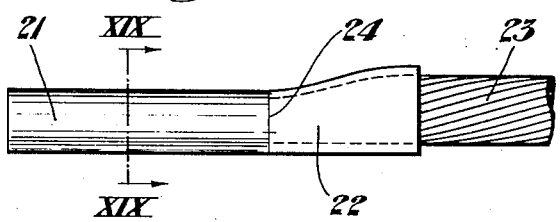
Figure 18 is a side elevation of one end of a straight terminal flame-weld rail bond constructed in accordance with this invention.
Figure 19:
Figure 19 is a transverse section on the line XIX—XIX of Figure 18.
Figure 20:
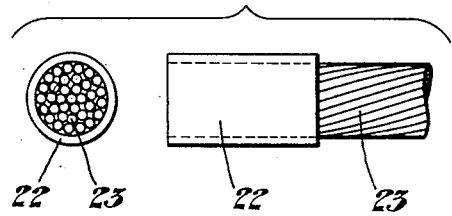
Figure 20 is a plan and end elevation of one end of a bond conductor having the sleeve portion of the bond terminal of Figure 18 mounted thereon.
Figure 21:
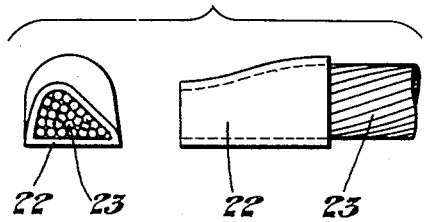
Figure 21 shows a side and end elevation of the conductor end and sleeve of Figure 20 after the conductor and sleeve have been pressed and shaped to fit the terminal body.

Referring more particularly to Figures 1 to 5 of the drawings, which show a rail bond constructed in accordance with this invention, the numeral 2 designates the body portion of the terminals which is preferably formed from a short length of round stock or bar as shown in Figure 3. A round sleeve member 3 is mounted on each end of the flexible stranded conductor 4 as shown in Figure 4 and the ends of the conductor and sleeve are then pressed to secure the sleeves in position and shape the ends of the conductor and sleeves to fit against the side of the body portion 2 to which they are to be butt-welded. After the ends of the conductor 4 and sleeves 3 are pressed to shape, one end will be positioned against the terminal body 2 in a suitable butt-welding machine of any standard type, and the end of the conductor 4 and sleeve 3 and the portion of the terminal body 2 to which the end of the conductor and sleeve is to be welded is heated by the passage of an electric current across the abutting faces to at least a plastic temperature and the end of the conductor and the sleeve 3 are then forced against the body 2 forming a butt-weld as at 5.

After the terminals are welded they may be milled to form the plug portion 5ᵇ and rim 5ᶜ, or otherwise finished to size and shape if desired.

In Figures 6 to 9 I have shown one end of a rail bond similar to that of Figures 1 to 5, except that the body portion of the terminal is preformed by forging to form the plug portion 2ᵃ and a rim portion 2ᵇ. A round sleeve 3ᵃ is mounted on the end of the stranded flexible conductor 4ᵃ and the end of the conductor and sleeve are pressed or flattened as shown in Figure 9 to secure the sleeve on the conductor and to shape the end of the sleeve and conductor to the same cross-section as the cross-section of the portion of the rim 2ᵇ to which the end of the conductor and sleeve are to be butt-welded.

After the end of the conductor 4ᵃ and sleeve 3ᵃ are pressed to shape they will be positioned against the rim portion 2ᵇ of the terminal body 2 in a suitable butt-welding machine and heated and forced together to form a butt-weld as at 5ᵃ completing the bond terminal.

The rail bonds of Figures 1 to 9 are preferably formed of all copper stock, that is, the conductors and terminals are all copper. However, it will be understood that they may be formed with copper or a combination of copper and ferrous metal conductors and ferrous metal terminals, or of all ferrous metal as desired.

In Figures 10 to 13, I have shown one end of a T-head terminal rail bond having a steel faced terminal. This bond comprises a terminal head or body composed of a short length of steel strip or plate 10 drawn or otherwise shaped to have concave and flat sides, and a copper plate or strip 11 which is welded to the flat side of the plate 10.

The flexible stranded conductor 12 is provided with a sleeve 13, and the conductor and sleeve are pressed to secure the sleeve in position and shape the end of the conductor and sleeve to fit against the copper plate 11 and not project beyond the edges thereof.

After the body of the terminal and the conductor and sleeve are assembled, the assembled parts will be mounted in a standard butt-welding machine as described, for the crown bonds and heated and forced together forming the butt-weld 14 between the end of the conductor and sleeve and plate 11.

The sleeves 13 may be composed of either ferrous or copper metal, and if desired, the copper plate 11 may be omitted; also the conductor may be composed of either ferrous or copper metal or a combination of such metals, since by butt-welding a joint having good electrical conductivity is obtained.

In Figures 14 to 17 I have shown one end of a straight terminal bond constructed in accordance with the method of this invention. The straight terminal of this bond has a body portion composed of an outer ferrous metal shell 16 which is filled with a copper core 17 welded to the shell. A steel or copper sleeve portion 18 is mounted on the bond conductor 19, and the conductor end and sleeve are pressed to secure the sleeve in position and shape the sleeve and conductor end to the same cross-section as the terminal body. After the terminal body and conductor end and sleeve are assembled and shaped, the butt ends of assembled conductor end and sleeve, and the end of the terminal body will be heated by the passage of an electric current thereacross and pressed together end for end forming a butt-weld joint as at 20.

In Figures 18 to 21 I have illustrated one end of a slightly different form of straight terminal bond particularly adapted for flame-welding to the rails. The terminal of this bond is composed of a solid copper body 21 forged or drawn to shape and a copper or steel sleeve 22 which is mounted on the end of the stranded conductor 23. After the sleeve 22 is mounted on the end of the conductor 23, they are pressed together to secure the sleeve in position and shape the conductor end and sleeve to the same cross-section as the cross-section of the terminal body 21. After the conductor end and sleeve have been shaped they are brought into contact with the end of the terminal body 21, and the end of the terminal body and the conductor and sleeve are heated and forced together forming a butt-weld 24 completing the bond.

It will be understood that while I have described the use of certain combinations of copper and steel parts for the above bonds that I do not wish to be limited thereto since various combinations of these metals may be used when butt-welded joints are made as described in this application.

It will also be understood that, if desired, any or all of the bonds described above may be machined or otherwise finished after the butt-welding operation, if desired.

Certain claims broad enough to include the specific forms shown in the present application are presented in my earlier application No. 134,454 filed September 9, 1926.

I claim:

1. In a rail bond comprising a pair of terminals and at least one flexible stranded conductor united thereto, the method of manufacturing the same which comprises securing a sleeve member upon the ends of the stranded conductor with the butt ends of each in substantial cross-sectional alignment, shaping the butt ends to a desired cross-sectional configuration and then uniting the said butt ends to the said terminals by electric resistance welding, the said welding process providing for the pressure consolidation of the abutting faces while the metal comprising said faces is heated at least to a plastic temperature.

2. In a rail bond comprising a pair of terminals and at least one flexible stranded conductor united thereto, the method of manufacturing the same which comprises securing a sleeve member upon the ends of the stranded conductor with the butt ends of each in substantial cross-sectional alignment and then uniting the said butt ends to a face on said terminals remote from the face to be attached to a rail, by electric resistance welding, the said welding process providing for the pressure consolidation of the abutting faces while the metal comprising said faces is heated at least to a plastic temperature.

3. In a rail bond comprising a pair of terminals and at least one flexible stranded conductor united thereto, the method of manufacturing the same which comprises securing a sleeve member upon the ends of the stranded conductor with the butt ends of each in substantial cross-sectional alignment and then uniting the said butt ends to a face on said terminals remote from the face to be attached to a rail, by electric resistance welding, the said welding process providing for the pressure consolidation of the abutting faces while the metal comprising said faces is heated to a plastic temperature and thereafter shaping the terminal portions of the assembly to the desired size, shape and configuration.

4. In a rail bond comprising a pair of terminals and at least one flexible stranded conductor united thereto, the method of manufacturing the same which comprises preforming the terminal to the desired size, shape and configuration and to provide a face thereon to which the said conductor is to be united, securing a sleeve member upon the ends of the stranded conductor with the butt ends of each in substantial cross-sectional alignment, shaping the butt ends to a cross-sectional configuration approximating the terminal face to which the conductor is to be attached, and then uniting the said butt ends to the said terminal by electric resistance welding, the said welding process providing for the pressure consolidation of the abutting faces while the metal comprising said faces is heated to a plastic temperature.

5. In a rail bond comprising a pair of terminals and at least one flexible stranded conductor united thereto, the method of manufacturing the same which comprises preforming the terminal to the desired size, shape and configuration and to provide a face thereon to which the said conductor is to be united, surfacing said face with a metal to which the conductor may be readily united by welding, securing a sleeve member upon the ends of the stranded conductor with the butt ends of each in substantial cross-sectional alignment, and then uniting the said butt ends to the provided face on said terminal by electric resistance welding, the said welding process providing for the pressure consolidation of the abutting faces while the metal comprising said faces is heated to a plastic temperature.

6. In a rail bond comprising a pair of terminals and at least one flexible stranded conductor united thereto, the method of manufacturing the same which comprises constructing the terminal to comprise a body portion of copper and an outer shell portion of a ferrous alloy, providing a face thereof to which the conductor is to be united, securing sleeve members upon the ends of said conductor with the butt ends of each in substantial cross-sectional alignment, and then uniting the said butt ends to the provided terminal face by electric resistance welding, the said welding process providing for the pressure consolidation of the abutting faces while the metal comprising said faces is heated to a plastic temperature.

7. A rail bond comprised of a pair of terminals and a stranded conductor united thereto, the butt ends of said conductor being pressure welded to said terminals at a face remote from the face to be attached to the rail.

8. A rail bond comprised of a pair of terminals, a stranded conductor united thereto, sleeve members about the ends of said conductor, the butt ends of said conductor and enclosing sleeve member being pressure welded to said terminals at a face remote from the face to be attached to the rail.

HAROLD H. FEBREY.